United States Patent [19]
Saito et al.

[11] Patent Number: 5,185,112
[45] Date of Patent: Feb. 9, 1993

[54] TITANIUM BORIDE CERAMIC MATERIAL

[75] Inventors: Hajime Saito, 1088-193 Aza-Hirako, Oaza-Fujieda, Nisshin-cho, Aichi-gun, Aichi-ken; Hideo Nagashima, Ebina; Junichi Matsushita; Shinsuke Hayashi, both of Nagoya, all of Japan

[73] Assignees: Hajime Saito; STK Ceramics Laboratory Corporation; Toshiba Ceramics Co., Ltd., all of Japan

[21] Appl. No.: 285,571

[22] Filed: Dec. 16, 1988

[30] Foreign Application Priority Data

Dec. 25, 1987 [JP] Japan ................................. 62-328627
Dec. 25, 1987 [JP] Japan ................................. 62-328628
Apr. 29, 1988 [JP] Japan ................................. 63-108869

[51] Int. Cl.$^5$ ............................................. C04B 35/58
[52] U.S. Cl. ........................................ 264/63; 264/56; 501/96
[58] Field of Search ................................ 264/56, 63

[56] References Cited

U.S. PATENT DOCUMENTS

| | | | |
|---|---|---|---|
| 2,974,040 | 3/1961 | Fisher et al. | 75/202 |
| 3,843,375 | 10/1974 | Murata | 106/43 |
| 3,895,399 | 1/1975 | Bailey et al. | 264/29 |
| 4,873,053 | 10/1989 | Matsushita et al. | 419/11 |

*Primary Examiner*—James Derrington
*Attorney, Agent, or Firm*—Lorusso & Loud

[57] ABSTRACT

A sintered titanium boride ceramic body consists essentially of a matrix having a three-dimensional net-work structure and consisting essentially of TiC and at least one MB selected from transition metals in a mixing crystals and solid solutions condition, $TiB_2$ particles separately placed in the matrix, and a grain boundary formed in the periphery of each of the $TiB_2$ particles. The grain boundary is in a mixing crystals and solid solutions condition of $TiB_2$ and M boride. M denotes a metal.

3 Claims, 11 Drawing Sheets

|——————|
10μm

|——————|
10μm

|—————|
10μm

——— Ti
------ Cr

|—————|
10μm

|—————|
10μm

TITANIUM BORIDE CERAMIC MATERIAL

BACKGROUND OF THE INVENTION

This invention relates to a sintered titanium boride ceramic material.

Conventional metal boride ceramic materials are manufactured by a hot pressing method, for example, as disclosed in Japanese Patent Laid-Open Nos. 52-106306 and 54-90314.

The conventional metal boride ceramic materials have poor density and low strength even if they are manufactured by hot pressing and sintered.

In the conventional sintered titanium boride ceramic material, no grain boundary is formed around the $TiB_2$ particles so that the $TiB_2$ particles cannot be prevented from growing. Thus, many pores can be easily formed among the $TiB_2$ particles which is apt to result in poor density and low strength particularly when the ceramic material is manufactured by pressureless sintering.

SUMMARY OF THE INVENTION

The object of this invention is to provide a sintered titanium boride ceramic body having a high density and a good strength and a method for producing the same.

According to this invention, a sintered titanium boride ceramic body consists essentially of a matrix having a three-dimensional net-work structure and consisting essentially of TiC and at least one boride of a transition metal in the form of mixed crystals or solid solutions, $TiB_2$ particles dispersed around the matrix, and a grain boundary formed in the periphery of each of the $TiB_2$ particles, the grain boundary being mixed crystals and solid solutions of $TiB_2$ and M, wherein a M boride denotes the transition metal.

The invention also provides a method for producing a sintered titanium boride ceramic body including the steps of:

(a) mixing 75-99 wt. % $TiB_2$ particles with 1-25 wt. % in total of Cr powder and C powder to make a mixture;

(b) applying a pressure to the mixture in a mold to make a green compact;

(c) applying further pressure to the green compact to shape the green compact into a ceramic body; and (d) sintering the shaped ceramic body in a non-oxidizing atmosphere.

DESCRIPTION OF EMBODIMENTS

Figure 1:
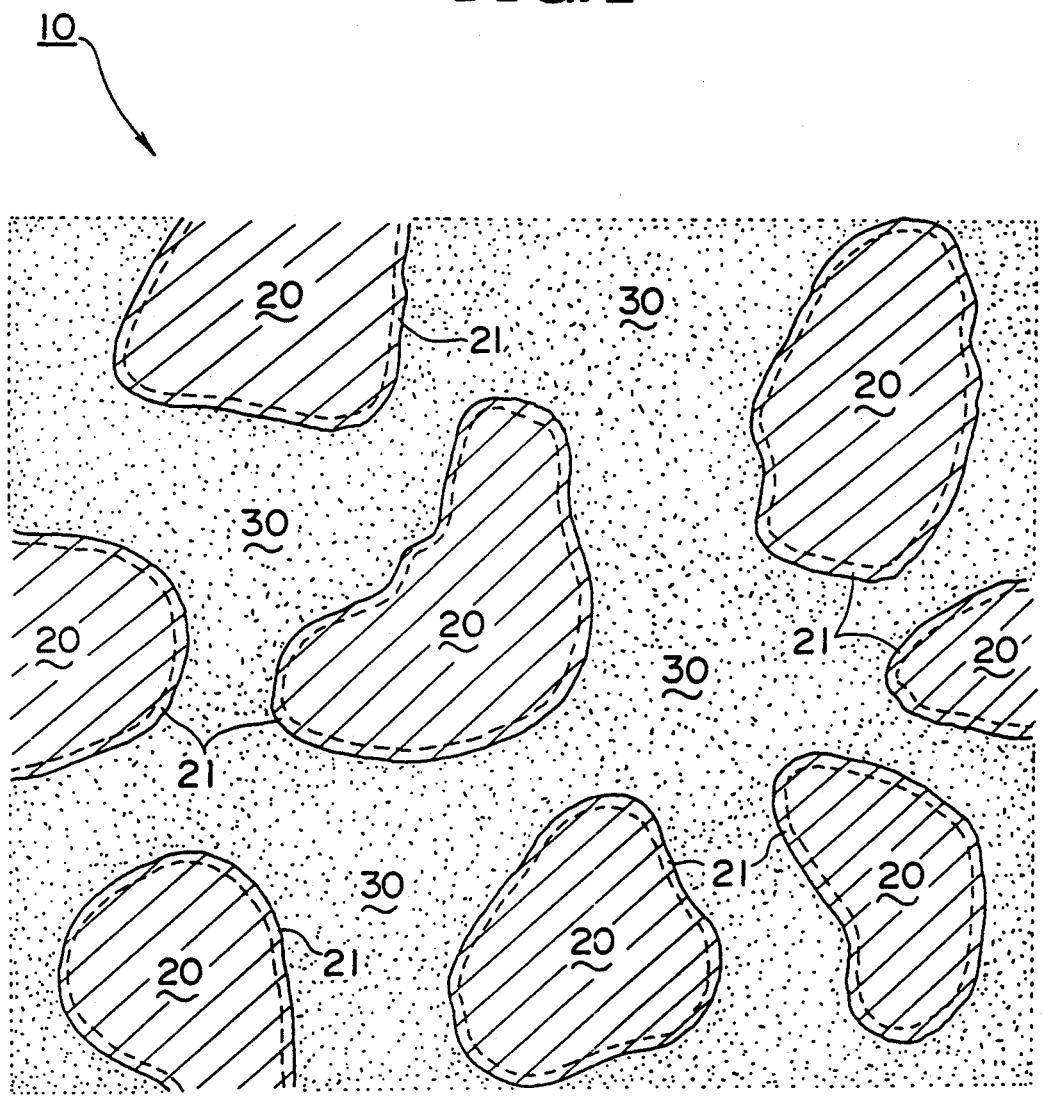
FIG. 1 is an enlarged sectional view showing a sintered titanium boride ceramic body according to this invention.

Referring to FIG. 1, a sintered titanium boride ceramic body 10 consists essentially of a matrix 30, $TiB_2$ particles 20 dispersed in the matrix 30, and a solid solution layer 21 formed around the periphery of each of the $TiB_2$ particles. The matrix 30 consists essentially of TiC and at least one metal boride (MB) selected from transition metals as mixed crystals and solid solutions. The matrix 30 has a three-dimentional net-work structure and functions as a binder. The solid solution layer 21 is in the form of mixed crystals or solid solutions of $TiB_2$ and a metal boride (MB) such as CrB. The solid solution layer 21 is formed integral with each of the $TiB_2$ particles 20 as a part thereof.

The matrix 30 is formed by the following equations:

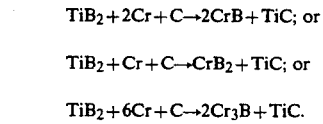

$$TiB_2 + 2Cr + C \rightarrow 2CrB + TiC; \text{ or}$$

$$TiB_2 + Cr + C \rightarrow CrB_2 + TiC; \text{ or}$$

$$TiB_2 + 6Cr + C \rightarrow 2Cr_3B + TiC.$$

In the matrix 30, TiC and a chromium boride such as CrB, $CrB_2$ or $Cr_3B$ are mixed in the crystal phases and solid solutions condition in such a way that the pores can be sufficiently removed. The $TiB_2$ particles are strongly bound by the matrix 30 via the grain boundary 21. Also, the relative density of the sintered ceramic body 10 can be 95% or more. The term "relative density" means (bulk density/theoretical density).

Figure 13:
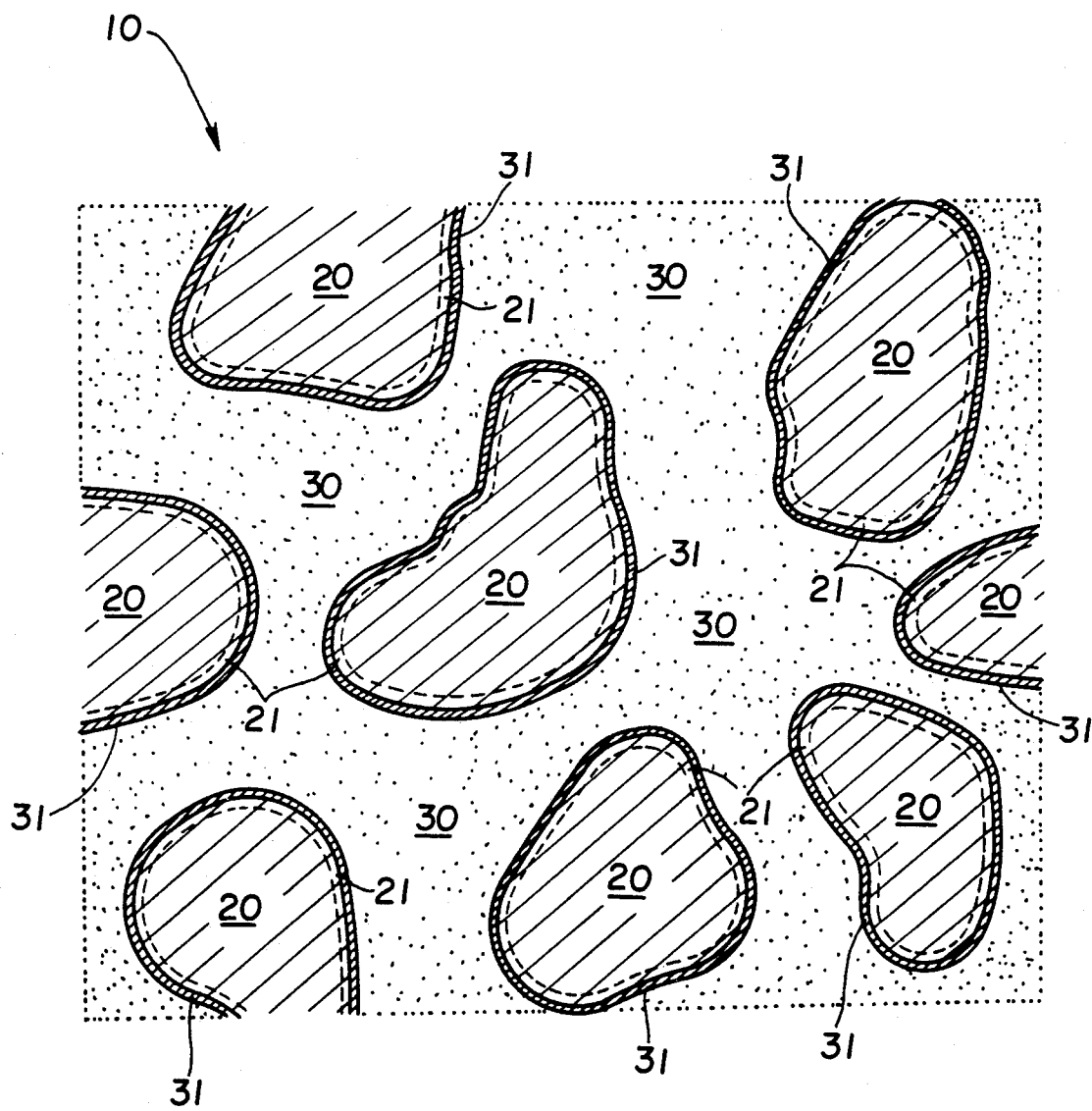
FIG. 13 is a sectional view corresponding to FIG. 1 but shows another sintered titanium boride ceramic body according to this invention.

FIG. 13 shows another sintered titanium boride ceramic body 10 consisting essentially of a matrix 30, a grain boundary layer 31, $TiB_2$ particles 20 dispersed placed in the matrix 30, and a solid solution layer 21.

The sintered titanium boride ceramic body can be produced as follows:

As a first step, 75-99 wt. % $TiB_2$ particles are mixed with 1-25 wt. % in total of Cr powder and C powder to thereby make a mixture.

Preferably, $TiB_2$ particles each have an average particle diameter of 0.5 to 8 microns (for the best results 0.5 to 3 microns), a maximum diameter of 12 microns (for the best results 6 microns) and a purity of 99 wt. % or more. Cr powder has an average diameter of 1 to 5 microns (for the best results 1 to 3 microns) and a maximum, diameter of 12 microns (for the best results 6 microns). C powder such as carbon black powder has a specific surface area of 50 to 150 $m^2/g$ (for the best results 80 to 150 $m^2/g$), a purity of 99.9 wt. % or more, an average diameter of 10 to 100 nanometers (for the best results 10 to 50 nanometers) and a maximum diameter of 150 nanometers (for the best results 100 nanometers).

Preferred weight ratio of Cr powder/C powder is from 7:0.1 to 7:10.

As a second step, the mixture is further mixed so as to become homogeneous.

In a third step, the mixture is set in a mold together with a binder such as polyvinylalcohol. After that, a pressure of 100-800 $Kg/cm^2$ is uniaxially applied to the mixture to thereby make a green compact.

In a fourth step, a pressure of 800-3,500 $Kg/cm^2$ is further applied to the green compact, for example, by a cold isostatic press method so that a ceramic body is shaped, for example, in the form of a nozzle or sleeve.

As a fifth step, the shaped ceramic body is sintered at 1,500°-2,000° C. (preferably 1,700°-1,900° C.) by a pressureless method or under a pressure of 100-500 $Kg/cm^2$ in a non-oxidizing atmosphere such as Ar or $H_2$ gas to thereby make a sintered ceramic body such as the ceramic body 10 shown in FIG. 1.

The ceramic body may be preferably machined in a finishing step as a sleeve for rolling or looping a wire rod as disclosed in Japanese Patent Application No. 63-108869.

EXAMPLE 92.5 wt. % $TiB_2$ particles having an average diameter of 3 microns, a maximum diameter of 6 micron meters and a purity of 99 wt. % were mixed with 7.5 wt. % in total of Cr powder having an average diameter of 1 micron and carbon black powder having a specific surface area of 135 $m^2/g$ and a purity of 99 wt. % to thereby make a mixture. The weight ratio of Cr/C was 7:1. The mixture 100 parts were set in a plastic container together with urethane balls and 300 parts ethylenealcohol and then mixed in a wet condition for 24 hours. The mixture was maintained at 60° C. for 10 hours so as to be dried.

After that, of the mixture 100 parts was set in a mould together with 2 parts polyvinylalcohol 2 parts 2 parts as a binder. A pressure of 300 $Kg/cm^2$ was uniaxially applied to the mixture to thereby make a green compact. In addition, a pressure of 3,000 $Kg/cm^2$ was applied to the green compact by a cold isostatic press method to thereby shape a ceramic body in the form of a desired rolling sleeve which will be later described.

The shaped ceramic body is heated to 1,900° C. at a heating rate of 15° C./minute in Ar atmosphere by a pressureless method and then maintained at 1,900° C. for one hour to thereby make a sintered ceramic body.

Figure 12:
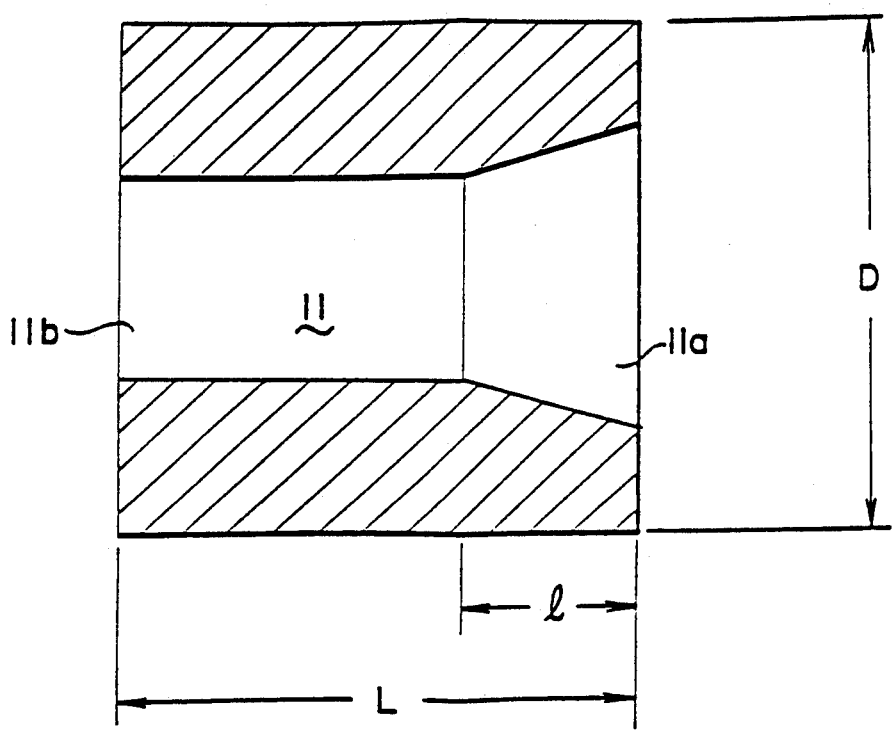
FIG. 12 is a shematic sectional view showing a rolling sleeve made of the sintered ceramic body according to this invention.

As shown in FIG. 12, the sintered ceramic body is machined as a finishing step so as to make a rolling sleeve having a through-hole 11, a length L of 30 mm and an outer diameter D of 30 mm. The through-hole 11 has a tapered portion 11a having a length 1 of 10 mm and a cylindrical portion 11b.

FIGS. 2 to 11 show test results for pieces cut from the sintered ceramic body.

Figure 2:
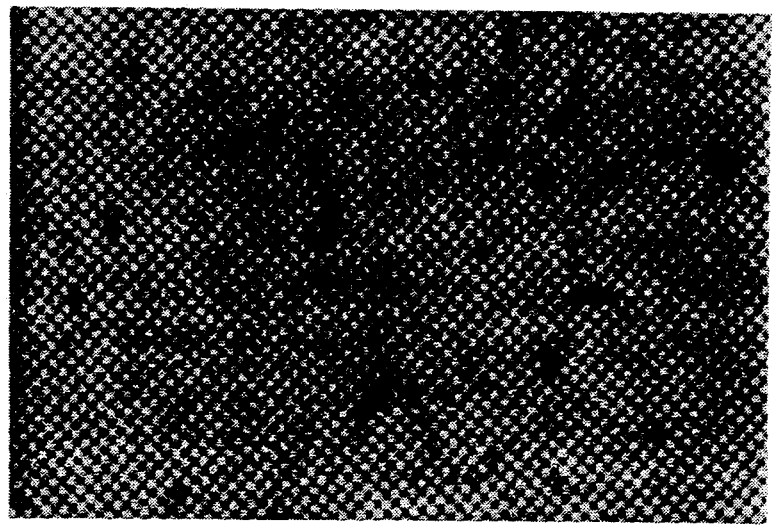
FIGS. 2 to 11 show various experimental results for the sintered ceramic body.

FIG. 2 is an optical micrograph showing the microstructure of the ceramic body after polishing.

Figure 3:

FIG. 3 is a scanning electron micrograph showing the microstructure of the ceramic body.

Figure 4:

FIG. 4 is an optical micrograph showing the microstructure of the ceramic body after etching.

Figure 5:
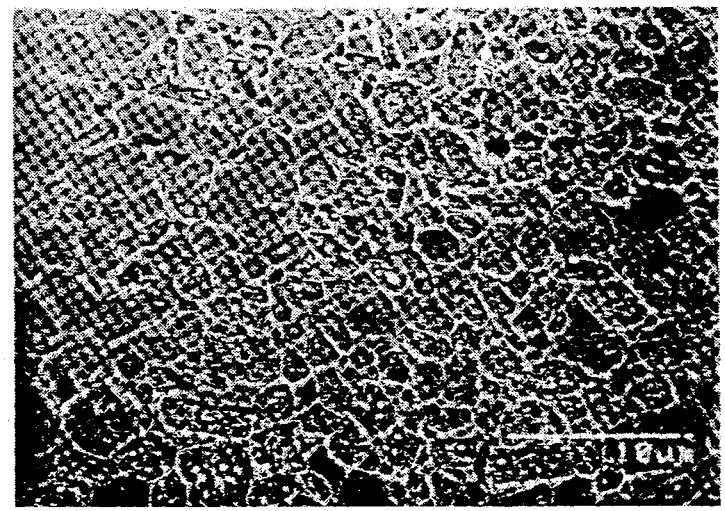

FIG. 5 is a scanner type electron micrograph showing the microstructure of the ceramic body after etching.

Figure 6:
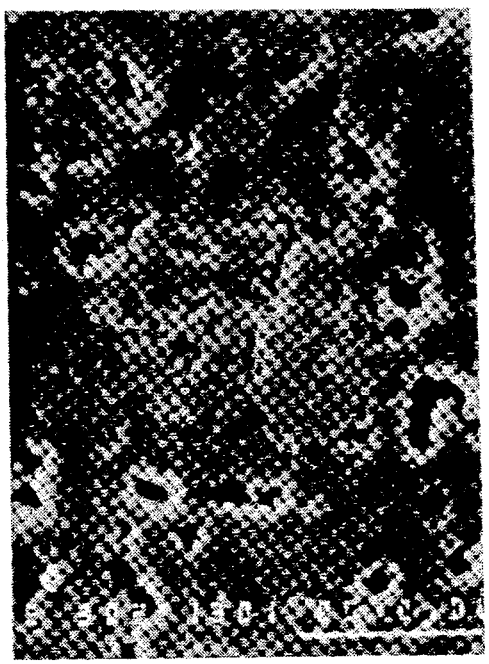

FIG. 6 is a scanner type electron micrograph showing the microstructure of the ceramic body after polishing. In the black portions, some particles were removed during the polishing treatment.

Figure 7:
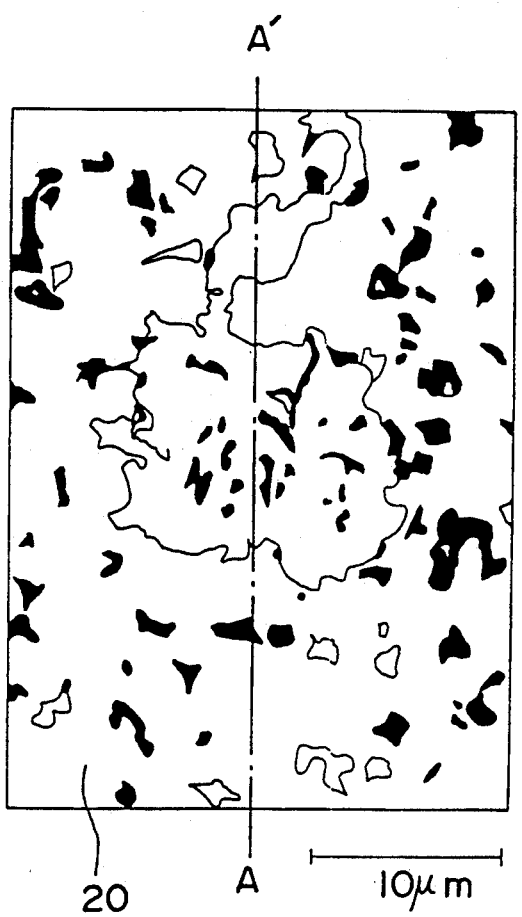

FIG. 7 is a view corresponding to FIG. 6 illustrating that some particles were removed during the polishing treatment.

Figure 8:
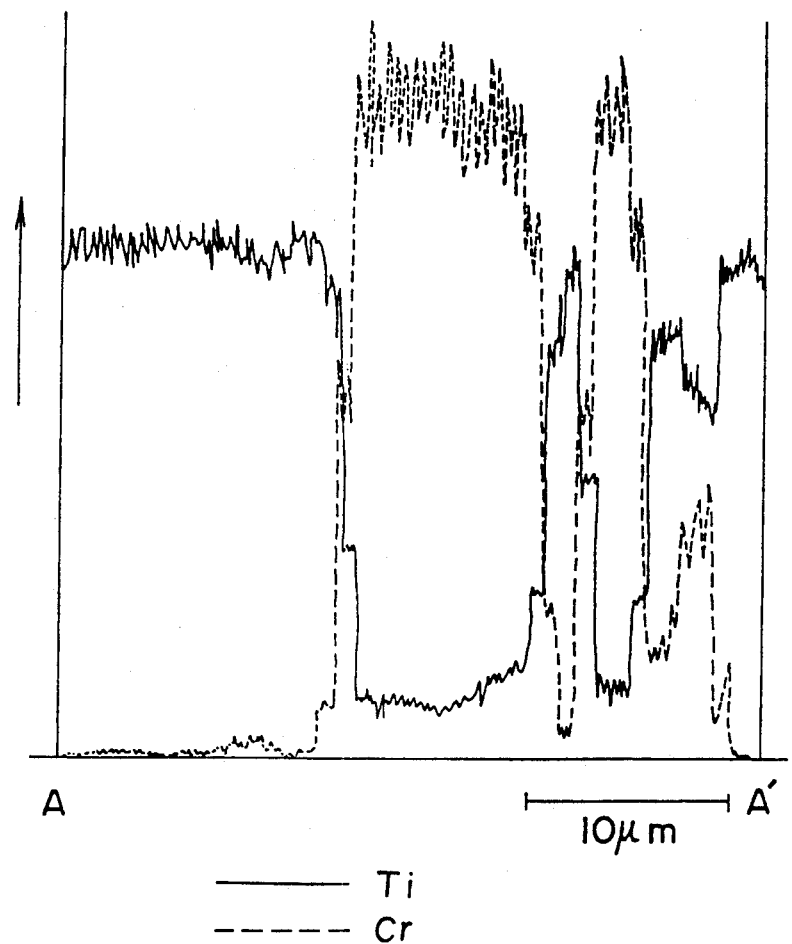

FIG. 8 is a view showing a X-ray intensity profile taken along the line A—A' of FIG. 7. A polished outer surface of the ceramic body was examined by an EPMA method so as to analyze the microstructure.

Figure 9A:
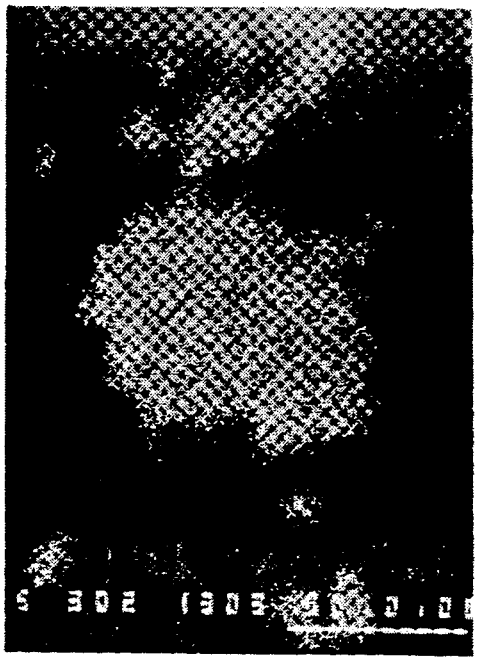

FIG. 9a is a view showing a X-ray intensity profile taken from the whole surface of the ceramic body shown in FIGS. 6 and 7. In the white portions, Ti is present.

Figure 9B:
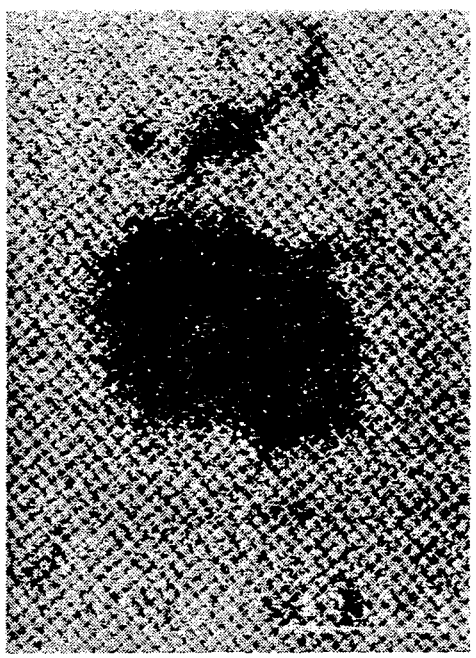

FIG. 9b is a view corresponding to FIG. 9a, but Cr is present in the white portions.

Figure 9C:
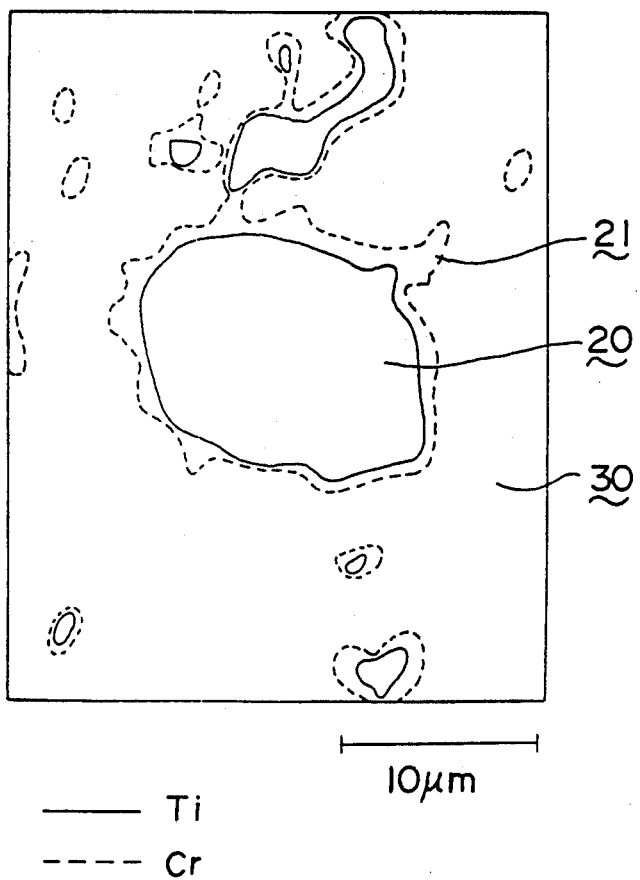
Figure 11:
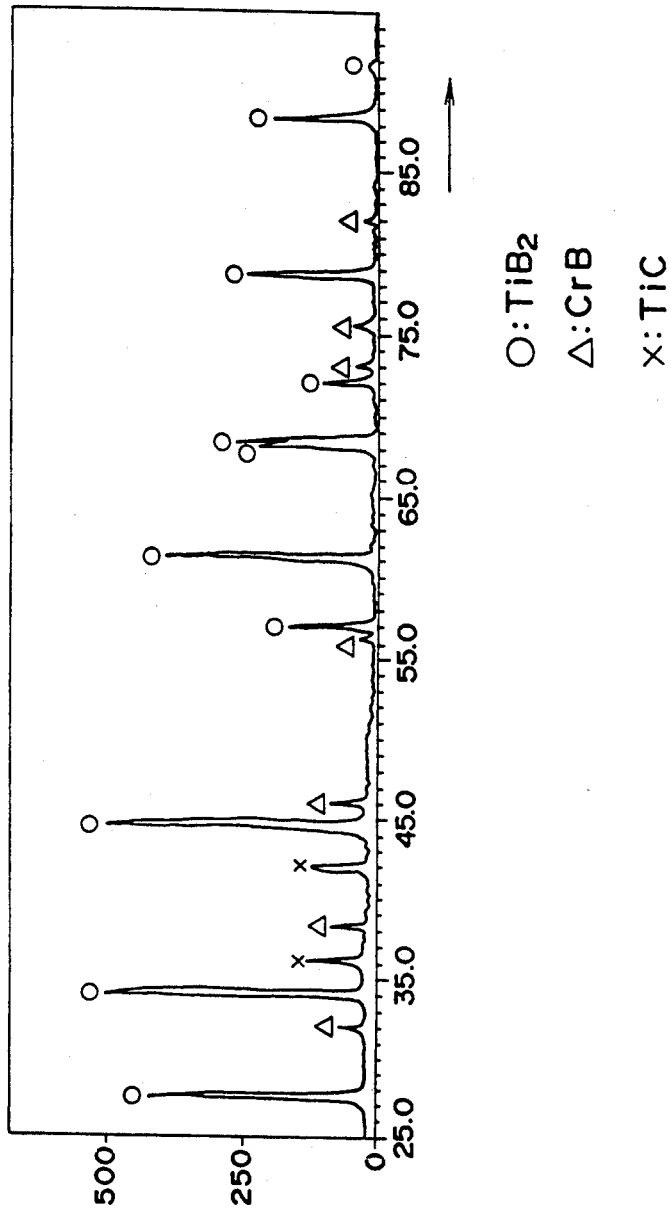

FIG. 9c is an explanation view showing a condition in which the views of FIG. 9a and FIG. 9b exactly overlap. The broken line denotes Cr, and the solid line denotes Ti.

Figure 10:
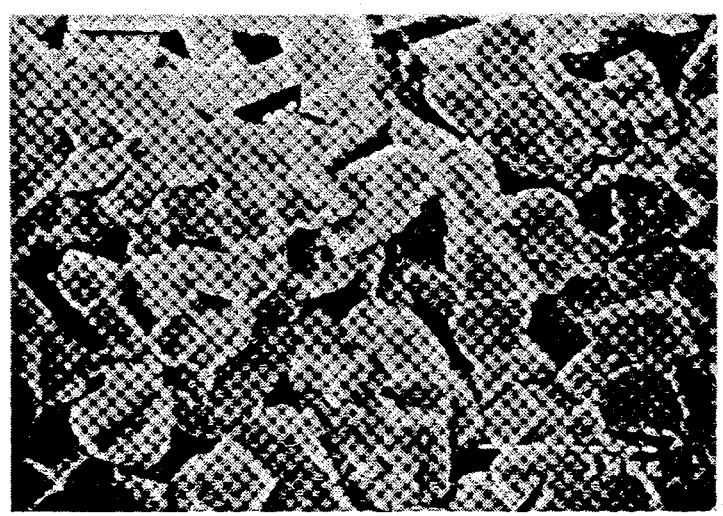

FIG. 10 is a graph showing the X-ray diffraction pattern for the ceramic body.

Also, the sintered ceramic body had a porosity of zero %, a bending strength of 525 MPa, a thermal shock resistance of 950° C., a Vickers hardness of 25 GPa and a thermal conductivity of 100 W/mK.

We claim:

1. A method for producing a sintered titanium boride ceramic body comprising the steps of:
    (a) mixing 75-99 wt. % $TiB_2$ particles with 1-25 wt. % in total of Cr powder and C powder, together with a binder, to make a mixture wherein the weight ratio of Cr powder/C powder is from 7:0.1 to 7:10;
    (b) applying a pressure of 100-800 $kg/cm^2$ to the mixture in a mold to make a green compact;
    (c) applying further a pressure of 800-3500 $kg/cm^2$ to the green compact by cold isostatic pressing to shape a ceramic body; and
    (d) pressureless sintering the shaped ceramic body in non-oxidizing atmosphere at a temperature of 1500°-2000° C. to form the sintered titanium boride ceramic body consisting essentially of a matrix having a three-dimensional net-work structure, $TiB_2$ particles dispersed in the matrix, and a solid solution layer formed around the periphery of each of the $TiB_2$ particles, the solid solution layer being mixed crystals and solid solutions of $TiB_2$ and Cr boride.

2. The method of claim 1, wherein the average diameter of the $TiB_2$ particles is 0.5 to 8 microns; the maximum diameter of the $TiB_2$ particles is 12 microns; the average diameter of the Cr powder is 1 to 5 microns; the maximum diameter of the Cr powder is 12 microns; the average diameter of the C powder is 10 to 100 nanometers; and the maximum diameter of the C powder is 150 nanometers.

3. The method of claim 1, wherein the C powder has a specific surface area ranging between 50 and 150 $m^2/g$.

* * * * *

UNITED STATES PATENT AND TRADEMARK OFFICE
CERTIFICATE OF CORRECTION

PATENT NO. : 5,185,112
DATED : February 9, 1993
INVENTOR(S) : SAITO et al

It is certified that error appears in the above-identified patent and that said Letters Patent is hereby corrected as shown below:

Col. 2, line 16, delete "the";

line 17, delete "condition";

line 27, delete "placed"; and line 39, delete the comma ",".

Col. 3, line 2, delete "meters"; and "micron" should be --microns--;
line 15, delete "of the mixture"
line 15, after "parts" insert --of the mixture--.

Signed and Sealed this

Eighteenth Day of May, 1993

*Attest:*

MICHAEL K. KIRK

*Attesting Officer*    *Acting Commissioner of Patents and Trademarks*